United States Patent [19]

Takeda et al.

[11] Patent Number: 4,678,954
[45] Date of Patent: Jul. 7, 1987

[54] ROTOR WITH PERMANENT MAGNETS HAVING THERMAL EXPANSION GAPS

[75] Inventors: Tamio Takeda, Yokkaichi; Toshio Gokyu, Mie; Yuji Mizutani, Kuwana; Jun Nakashima, Mie, all of Japan

[73] Assignee: Kabushiki Kaisha Toshiba, Kawasaki, Japan

[21] Appl. No.: 869,336

[22] Filed: Jun. 2, 1986

[30] Foreign Application Priority Data

Mar. 5, 1986 [JP] Japan .............................. 61-31524[U]
Mar. 5, 1986 [JP] Japan .............................. 61-31525[U]

[51] Int. Cl.⁴ ........................ H02K 21/14; H02K 1/18
[52] U.S. Cl. ................................... 310/156; 29/598; 310/65; 310/261
[58] Field of Search ................. 310/153, 156, 261, 42, 310/65; 29/598

[56] References Cited

U.S. PATENT DOCUMENTS 4,433,261 2/1984 Nashiki et al. ...................... 310/156
4,464,596 8/1984 Miller et al. ......................... 310/156

FOREIGN PATENT DOCUMENTS 5673165 11/1979 Japan .

*Primary Examiner*—Patrick R. Salce
*Attorney, Agent, or Firm*—Oblon, Fisher, Spivak, McClelland & Maier

[57] ABSTRACT

A pair of positioning rings are engaged on the outer peripheral surface of a shaft, and a plurality of permanent magents are provided on the outer surface of the shaft between the positioning rings. The permanent magnets are bonded to the shaft by a bonding agent which fills the spaces between the shaft and the permanent magnets, and an air gap is formed between the permanent magnets and the positioning rings, to allow thermal expansion.

10 Claims, 19 Drawing Figures

ROTOR WITH PERMANENT MAGNETS HAVING THERMAL EXPANSION GAPS

FIELD OF THE INVENTION

The present invention relates to a rotor to which permanent magnets are fixed and a method for manufacturing the same.

BACKGROUND OF THE INVENTION

Figure 1:
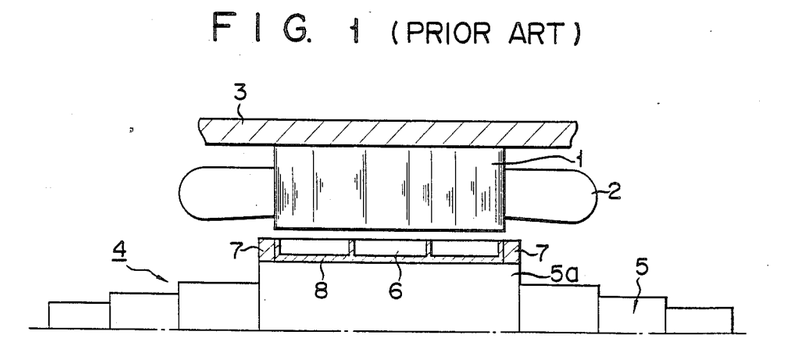
FIG. 1 shows a schematic view of a prior rotating machine comprising a rotor and a stator.
Figure 2:
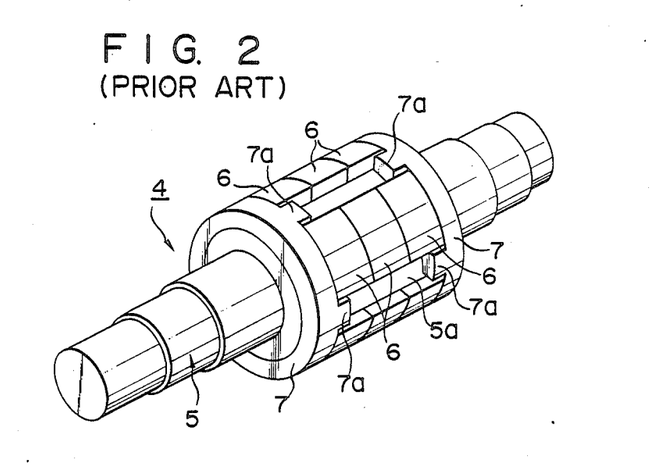
FIG. 2 shows a perspective view of the rotor in FIG. 1.

As shown in FIG. 1, a rotor 4 is combined with a stator to construct a rotating machine. The stator has core 1 and a coil 2, with the coil 2 wound around core 1, and is engaged within a frame 3. As shown in FIG. 2, a large-diameter portion 5a is formed substantially at the axial center of a shaft 5 of the rotor 4. A pair of positioning rings 7 are engaged with both axial ends of the large-diameter portion 5a. The positioning rings 7 are formed, for example, of a nonmagnetic material such as aluminum or stainless steel, and a plurality of projections 7a extend axially from the opposed positions of the positioning rings 7. Sets of three permanent magnets 6 are provided on the large-diameter portion 5a of the shaft 5, between the positioning rings 7. Each set of permanent magnets 6 is disposed on the outer peripheral surface of the large-diameter portion 5a of the shaft 5, limited by two pairs of adjacent projections 7a, positioned in the circumferential direction of the shaft 5. Each set of three permanent magnets 6 is formed with an arcuate cross section and is disposed along the axial direction of the shaft 5.

Figure 3:
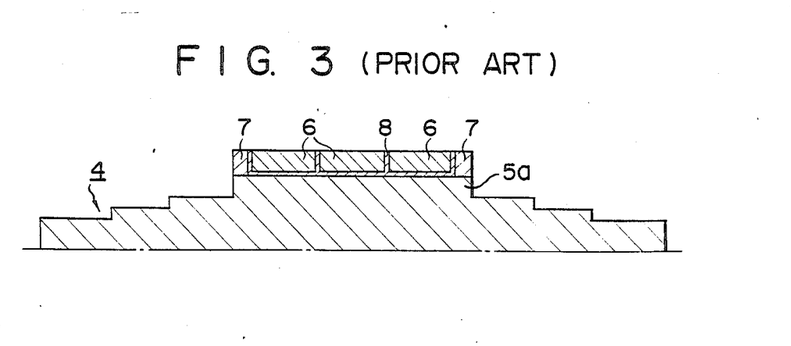
FIG. 3 shows a partial, cross-sectional view of the rotor in FIG. 1.

A bonding agent 8 for bonding the permanent magnets 6 to the shaft 5, as shown in FIGS. 1 and 3, fills not only the spaces between the permanent magnets 6 and the large-diameter portion 5a of the shaft 5, but also the space between the permanent magnets 6 and the positioning rings 7.

Recently, there has been an acceleration in developments to reduce the size of various devices and machines. Work to decrease size and increase output power has likewise been proceeding in the field of rotor-equipped rotating machines, giving rise to the problem of high temperatures in these machines. Since a bonding agent fills the space between the permanent magnets 6 and the positioning rings 7 in a rotor of conventional construction, no air gap is provided to allow the permanent magnets 6 and the positioning rings 7 to expand when they heat up due to the temperature rising in the machine. Consequently, excessive stress is produced in the compressing direction of the permanent magnets 6, causing them to crack, with the risk that they may eventually separate and scatter from the shaft 5.

In a cooling process in which the permanent magnets 6 are formed and a motor stops, tensile stress is generated in the permanent magnets 6 due to the contraction of the bonding agent 8 the expansion coefficient of which is great, causing the permanent magnets 6 to crack, with the risk that they may eventually separate and scatter from the shaft 5.

Recently, an increase in the rotor speed of rotating machines has further been required, in addition to the reduction in size and the increase in output power. As the rotational speed of the rotor is increased, the centrifugal force further increases, as does the temperature in the machine. A rotor for use under such conditions must therefore possess sufficient thermal and mechanical strength. However, there is an irregularity in bonding strength, when bonding permanent magnets to a shaft, due to the contamination of the bonding surfaces and the curing conditions of the bonding agent, thereby preventing the attainment of sufficient reliability in the unit's strength. Thus, there might arise the problem of the permanent magnets separating and scattering, due to centrifugal force, during rotation.

It has recently been proposed to rigidly bond permanent magnets to a shaft by winding an insulating film, for example, around the outer peripheral surfaces of the magnets to be bonded, while simultaneously applying a strong tension to the film. However, the film weakens when an external force is concentrated on one point. Thus, pinholes occur at the portions of the film in contact with the corners of the magnets, and the film may crack from these pinholes, over its entirety at the winding time or when the rotor rotates. Therefore, the winding of the film must be done very carefully, thereby resulting in low workability and the problem of reliability of the reinforcement.

Heretofore, the method for manufacturing a rotor formed by bonding permanent magnets has included, in general, coating an ambient temperature-curable or thermosetting bonding agent of epoxy resin on the outer peripheral surface of a shaft, placing permanent magnets of arcuate cross section on the coated surface, and retaining the magnets by a jig until the agent is cured.

However, since the ambient temperature curable bonding agent takes as long as 3 to 16 hours to cure, it is difficult to automate the manufacturing steps, thereby resulting in low productivity, and the requirement of a number of implements for retaining the magnets during the long curing period. Thus, there also arises the problem of high manufacturing cost. The thermosetting bonding agent has a shorter curing time than the ambient temperature-curable bonding agent, but it also takes a considerably long time, and thus has the same problem as above. Further, since the agent requires a curing heating furnace, its facility cost increases, thereby raising the manufacturing cost. A method has been considered for shortening the curing time by using an ambient temperature-curable bonding agent which is enhanced, for example, in reactivity, so as to eliminate the above-mentioned problems, but the availability period of the agent is shortened by the fast reaction speed, and the rapid work of a skillful technician is required. Thus, this method lacks universality for general use.

OBJECTS OF THE INVENTION

The present invention has been developed in consideration of this situation, and accordingly, its principal object is to provide a rotor with permanent magnets which has high workability, through the rigid bonding of these permanent magnets to a shaft, thus eliminating the risk of separation of the magnets from the shaft, and thereby achieving high operational reliability.

It is another object of the present invention to provide a method for manufacturing a rotor with permanent magnets which can shorten the time required to bond the magnets to a shaft, which can improve productivity, and which possesses a high workability.

SUMMARY OF THE INVENTION

According to the invention, there is provided a rotor with permanent magnets comprising a shaft, a pair of positioning rings axially spaced on the outer peripheral surface of the shaft, and permanent magnets bonded to the outer peripheral surface of the shaft between the pair of positioning rings, the permanent magnets being disposed along an air gap between the positioning rings.

According to the invention, there is further provided a rotor with permanent magnets comprising a shaft, permanent magnets bonded to the outer peripheral surface of the shaft, and a reinforcing member wound around the outer peripheral surface of the permanent magnets. The reinforcing member is made of woven fibers for reinforcing the bonding of the permanent magnets.

According to the invention, there is still further provided a method for manufacturing a rotor with permanent magnets comprising the steps of: coating an anaerobic and ultraviolet-curable bonding agent (for bonding the permanent magnets to a shaft) over the butting surfaces of the shaft and the permanent magnets.

DETAILED DESCRIPTION OF THE PREFERRED EMBODIMENTS

A first embodiment of the present invention will be described in detail with reference to FIGS. 4 to 6.

Figure 4:
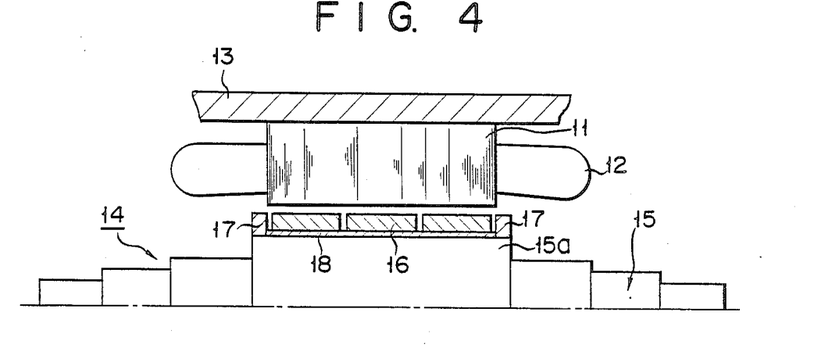
FIG. 4 shows a schematic view of a rotating machine comprising a rotor and a stator.
Figure 5:
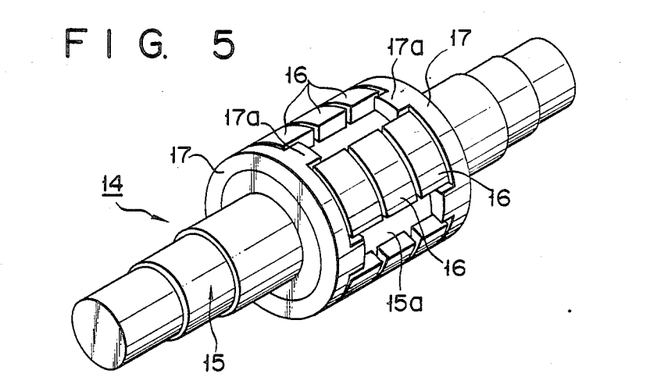
FIG. 5 shows a perspective view of the rotor in FIG. 4 according to a first embodiment of the invention.

FIG. 4 shows an embodiment comprising a rotor 14, according to the present invention combined with a stator. The a stator has a stator core 11 and stator coil 12 wound on the stator core 11, and the stator core 11 is engaged with a frame 13. A large-diameter portion 15a is formed, as shown in FIG. 5, substantially at the axial center of a shaft 15. A pair of positioning rings 17 are respectively engaged with both axial ends of the large-diameter portion 15a. The positioning rings 17 are formed, for example, of a nonmagnetic material such as aluminum or stainless steel, and a plurality of projecting portions 17a extend axially from the opposed positions of the positioning rings 17. Sets of three permanent magnets 16 are provided on the outer peripheral surface of the large-diameter portion 15a of the shaft 15, between the positioning rings 17. Each set is disposed on the outer peripheral surface of the large-diameter portion 17a, limited by two pairs of adjacent projecting portions 17a, positioned in the circumferential direction of the shaft 15. The permanent magnets 16 are formed with an arcuate cross section, and they are disposed along the axial direction of the shaft 15.

Figure 6:
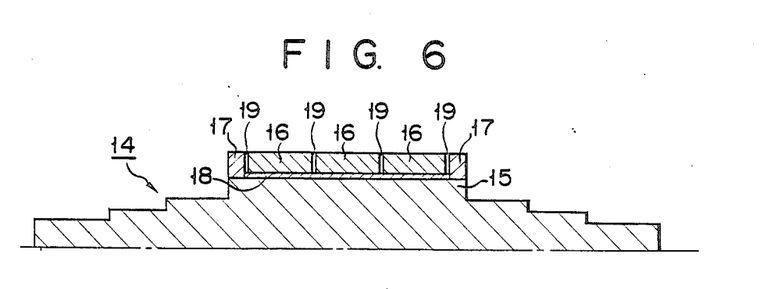
FIG. 6 shows a partial, cross-sectional view of the rotor shown in FIG. 5.

A bonding agent 18 for bonding the permanent magnets 16 to the shaft 15, as shown in FIG. 4 and FIG. 6, fills only the space between the permanent magnets 16 and the outer periphery of the shaft 15, but does not fill between the permanent rings 17 and the permanent magnets 16, nor between the permanent magnets 16. These nonfilled regions form air gaps 19.

According to the construction of this embodiment, even when the permanent magnets 16 and the positioning rings 17 become very hot, due to temperature rise in the rotating machinery associated with this rotor, thermal expansion of the permanent magnets 16 and the positioning rings 17 can be absorbed by the air gaps 19. Thus, the permanent magnets 16 do not produce excessive stresses. In this way, the embodiment can prevent the permanent magnets 16 from cracking due to stresses or from separating from the shaft 15, and thus remarkably improve reliability.

Figure 7:
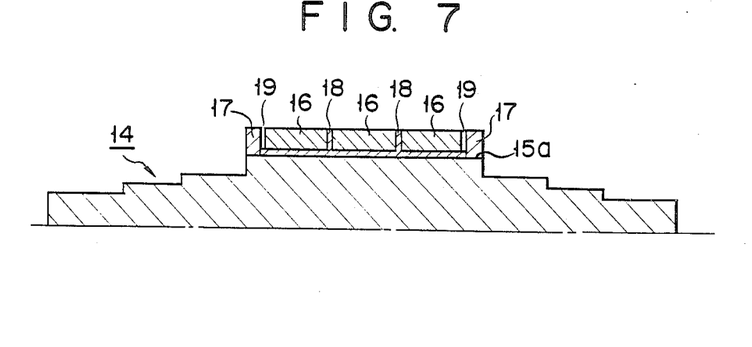
FIG. 7 shows a partial, cross-sectional view of a modification of the rotor shown in FIG. 5.

In the embodiment described above, each set of permanent magnets 16 has three permanent magnets 16 disposed along the axial direction of the shaft 15. However, the invention is not limited to this particular embodiment. For example, the permanent magnets may be formed as an integral unit. Further, the bonding agent 18 can be used, as shown in FIG. 7, also to fill the spaces between the permanent magnets 16. When the integral type is employed, or the bonding agent 18 is used to fill the spaces between the permanent magnets 16, the air gaps 19 between the positioning rings 17 should preferably be increased to larger than those in the first embodiment.

Figure 8:
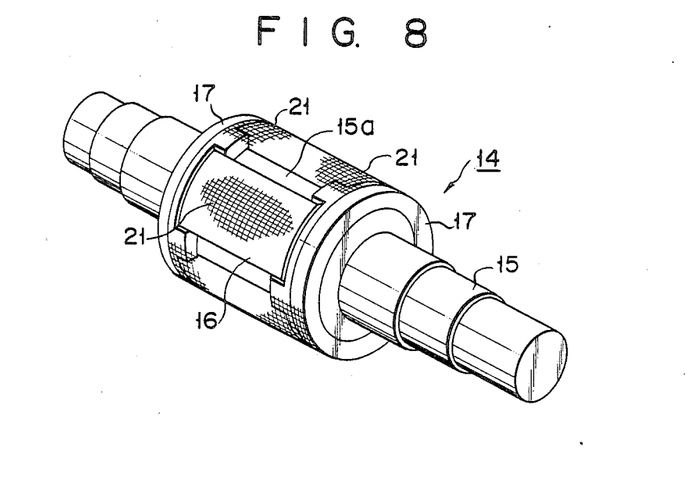
FIG. 8 shows a perspective view of a rotor according to a second embodiment of the invention.
Figure 9:
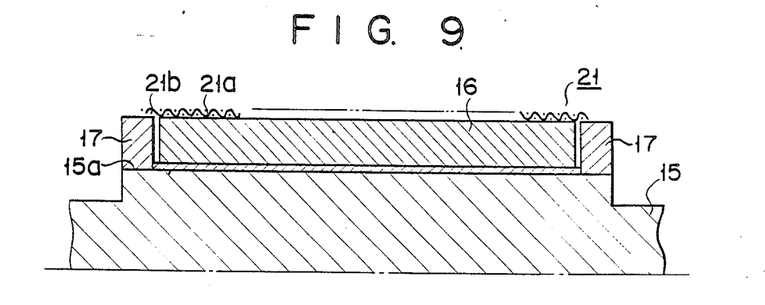
FIG. 9 shows a partial, cross-sectional view of the rotor shown in FIG. 8.
Figure 10:
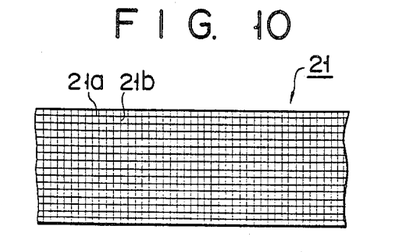
FIG. 10 shows a reinforcing member attached to the rotor shown in FIG. 8.

Referring to FIG. 8 to FIG. 10, a rotor according to a second embodiment of the present invention will be described.

The large-diameter portion 15a is formed, as shown in FIG. 8, substantially at the axial center of the shaft 15 of the rotor 14, similar to the previous embodiment. A pair of positioning rings 17 are respectively engaged with both axial ends of the large-diameter portion 15a. The positioning rings 17 are formed, for example, of a nonmagnetic material such as aluminum or stainless steel, and a plurality of projecting portions 17a extend axially from the opposed positions from the positioning rings 17. The permanent magnets 16 of arcuate cross section are provided on the outer peripheral surface of the large-diameter portion 15a of the shaft 15, between the positioning rings 17. The positioning rings 17 are engaged with the shaft 15 after coating an epoxy or acrylic bonding agent over the large-diameter portion 15a of the shaft 15. The permanent magnets 16 are then disposed at predetermined positions on the large-diameter portion 15a of the shaft 15, coated with the bonding agent, retained by a jig (not shown) until the bonding agent cures, and fixed to the shaft 15.

Reinforcing tapes 21 of bonding reinforcing means are wound, as shown in FIG. 8 and FIG. 9, around the outer peripheral surface of the permanent magnets 16, bonded to the shaft 15. The reinforcing tapes 21 are formed, as shown in FIG. 10, by weaving warp fibers 21b and weft fibers 21a. The warp fibers 21b, woven along the circumferential direction of the permanent magnets 16, are formed, for example, of thermally shrinkable synthetic resin fiber such as polyester fiber, and the weft fibers 21a, woven along the axial direction of the permanent magnets 16, are formed, for example, of nonshrinkable inorganic fiber such as glass fiber. The reinforcing tapes 21 are formed in advance in a strip shape. When the reinforcing tapes 21 are wound around the outer peripheral surfaces of the permanent magnets 16 disposed on the large-diameter portion 15a, the reinforcing tapes 21 are lap wound around the outer peripheral surfaces of the permanent magnets 16, substantially without tension, and the winding end is bonded to the lower-layer tape, for example, by fusing the warp fiber 21b 21a of polyester fiber by using a heater such as a soldering iron. After the reinforcing tapes 21 are thus wound, hot blast, for example, is blown onto the bonded tape to shrink the warp fibers 21b, thereby tightly winding the reinforcing tapes 21 around the outer peripheral surfaces of the permanent magnets 16, without leaving a gap. Further, epoxy or acrylic synthetic resin (not shown) is coated over the reinforcing tapes 21 and cured.

According to the construction of this second embodiment, the following advantages can be provided. The permanent magnets 16 are bonded to the shaft 15, and further pressed against the shaft 15 by the shrinking force of the warp fibers 21b, of the reinforcing tapes 21 wound on the outer peripheral surfaces of the permanent magnets 16. Thus, since the bonding strength of the permanent magnets 16 to the shaft 15 is remarkably enhanced, even if the rotor 14 rotates at high speed, an accident in which the permanent magnets 16 separate and scatter from the shaft 15 can be prevented, resulting in increased reliability in the unit's strength. Since the reinforcing tapes 21 are tightly wound around the outer peripheral surfaces of the permanent magnets 16 after heating, this facilitates excellent productivity as compared to a conventional rotor, in which an insulating film is wound carefully, while applying tension, so as not to break the film.

Since the reinforcing tapes 21 are formed by woven fibers, such tapes are extremely difficult to break, as compared with film, and thus greatly improve the reliability of the reinforcement. In other words, when film develops pinholes at the corners of the permanent magnets 16, the entire film may break when tension is applied. In contrast, even if the warp fibers 21b or the weft fibers 21a of the reinforcing tapes 21 woven by fibers are cut by the corners of magnets 16, the entire tapes 21 may not break, thus improving the reliability of the reinforcement.

Further, in this embodiment, since the permanent magnets 16 are pressed against the shaft 15 by the shrinking force of the fiber along the peripheral direction of the permanent magnets 16, and since the warp fibers 21b (woven along the circumferential direction of the permanent magnets 16) are formed of thermally shrinkable polyester fiber, and the weft fibers 21a (woven along the axial direction of the permanent magnets 16) are formed of the same inorganic glass fiber as the reinforcing tapes 21, the reinforcing tapes 21 can therefore mutually reinforce each other. In other words, if both the warp fibers 21b and the weft fibers 21a are formed of nonshrinkable fibers, sufficient pressing force of the permanent magnets 16 against the shaft 15 cannot be obtained (on the basis of shrinking forces of fibers), with the result that the bonding strength of the permanent magnets 16 greatly decreases. Conversely, if both the warp fibers 21b and the weft fibers 21a are formed of thermally shrinkable synthetic resin fiber, even if the pressing force of the permanent magnets 16 against the shaft 15 can be achieved, the shrinkage of the reinforcing tapes 21 occurs along the axial direction of the permanent magnets 16, and portions around which the reinforcing tapes 21 are not wound are formed between the reinforcing tapes 21 wound several times or at both axial ends of the permanent magnets 16, with the result that bonding strength decreases that much. Further, if both the weft fibers 21a and the warp fibers 21b are formed of synthetic resin fiber, heat resistance tends to become insufficient, thereby causing the bonding strength to decrease due to temperature rise in the rotating machine. On the other hand, in the second embodiment, since the warp fibers 21b necessary to obtain bonding strength are formed of thermally shrinkable synthetic resin fiber, and the weft fibers 21a (which do not considerably contribute to the improvement in the bonding strength) are formed of excellent thermal resistance inorganic fiber, the advantages of the respective fibers can be effectively combined to improve thermal resistance while providing sufficient bonding strength. Moreover, in this embodiment, synthetic resin is coated over the reinforcing tapes to be cured. Thus, the bonding strength can be further improved.

In the embodiment described above, strip-shaped reinforcing tapes 21 are used as reinforcing members. However, the present invention is not limited to this particular embodiment. For example, the reinforcing member may be formed of a tube with substantially the same outer diameter as those of the permanent magnets 16, and the tube can be woven in advance.

Figure 11:
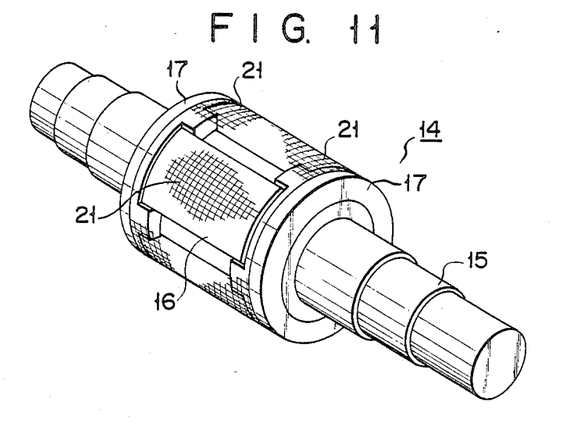
FIG. 11 shows a perspective view of a rotor according to a third embodiment of the invention.

A third embodiment of the present invention will be described with reference to FIG. 11 to FIG. 13.

This embodiment is different as regards the construction of the reinforcing tape 21, as compared to the second embodiment shown in FIG. 8 to FIG. 10, and the other construction is substantially the same as the second embodiment. Therefore, only the differences will be described. The same reference numbers as in the previous embodiment denote the same parts in the third embodiment, and a detailed description thereof will be omitted.

Figure 12:
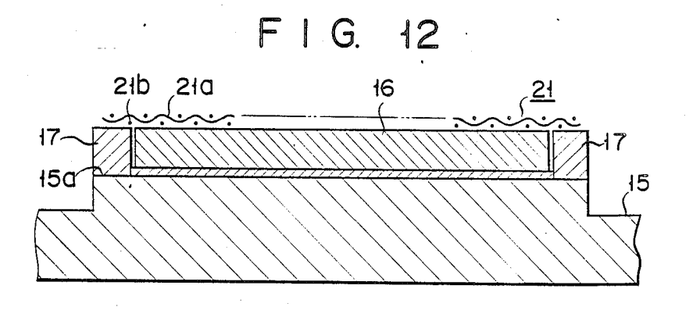
FIG. 12 shows a partial, cross-sectional view of the rotor shown in FIG. 11.
Figure 13:
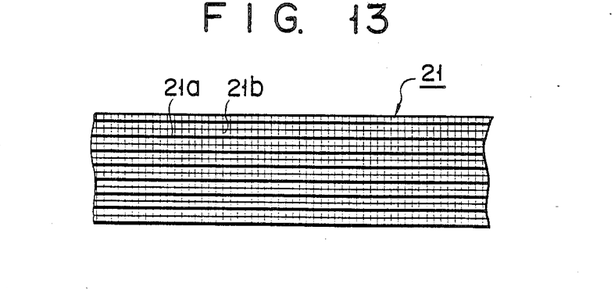
FIG. 13 shows a reinforcing member attached to the rotor shown in FIG. 11.

In this further embodiment, the reinforcing tapes 21 are formed, as shown in FIG. 12 and FIG. 13, by weaving warp yarns made, for example, of nonmagnetic metallic fine wires, such as stainless steel, molybdenum or tungsten and the weft yarns are made, for example, of inorganic fibers, such as glass fiber. When the reinforcing tapes 21 are wound around the outer peripheral surfaces of the permanent magnets 16, the reinforcing tapes 21 are so wound, as shown in FIGS. 11 and 12, that nonmagnetic metallic fine wires (i.e., the warp fibers 21b) are wound along the circumferential direction of the permanent magnets 16 and inorganic fibers (i.e., the weft fibers 21a) are wound along the axial direction of the permanent magnets 16. Since nonmagnetic metallic fine wires, as warp yarns, and the inorganic fibers, as weft yarns, are wound in the manner described above, the circumferential strength of the reinforcing tapes 21 becomes greater than the axial strength. Thus, strong tension can be applied when winding the reinforcing tapes 21, to thus increase the pressing force of the permanent magnets 16 against the shaft 15, thereby greatly enhancing the bonding strength of the permanent magnets 16 to the shaft 15.

Further, since the mechanical strength of the reinforcing tapes 21 can be improved while enhancing the heat resistance, as compared to a conventional strip-shaped insulating film, even if the rotor 14 rotates at a high speed, an accident in which the permanent magnets 16 separate and scatter from the shaft 15, as in a conventional rotor, can be prevented. Further, since the reinforcing tapes 21 have high tensile strength, when the reinforcing tapes 21 are wound around the permanent magnets 16, it is not necessary to wind them in the same manner as conventional insulating film, which must be wound carefully, while applying tension, to avoid breaking the film. This facilitates good workability and provides excellent productivity.

In the embodiment described above, the reinforcing tapes 21 use nonmagnetic metallic fine wires as warps and inorganic fibers as wefts, and both are woven in a strip shape. However, the invention is not limited to this particular embodiment. For example, the inorganic fiber may be used as warps and the nonmagnetic metallic fine wires and the inorganic fibers may be used alternatively woven, and the inorganic fibers may be used as wefts, and woven in a strip shape.

A fourth embodiment of the present invention will be described with reference to FIG. 14 to FIG. 16.

This still further embodiment differs only in the construction of the reinforcing tapes 21 and winding state, from the previous embodiments in FIG. 8 to FIG. 10 and FIG. 11 to FIG. 13, and the other part numbers are substantially the same as those of the previous embodiments. The same reference numbers as in the previous embodiments denote the same parts as in the previous embodiments, and a detailed description thereof will be omitted.

Figure 14:
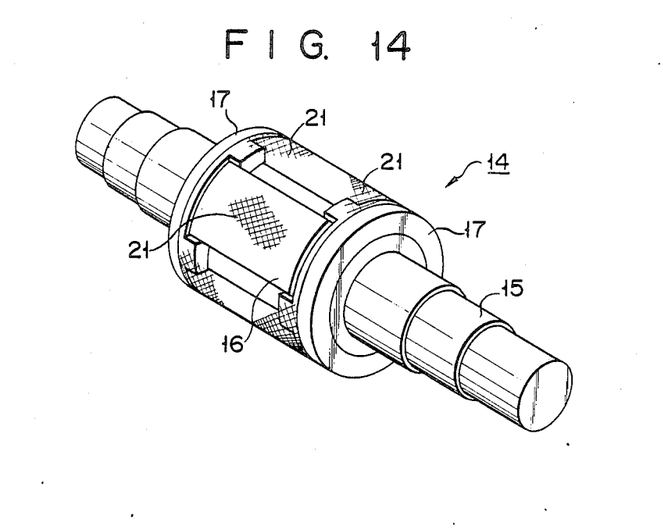
FIG. 14 shows a perspective view of a rotor according to a fourth embodiment of the invention.
Figure 15:
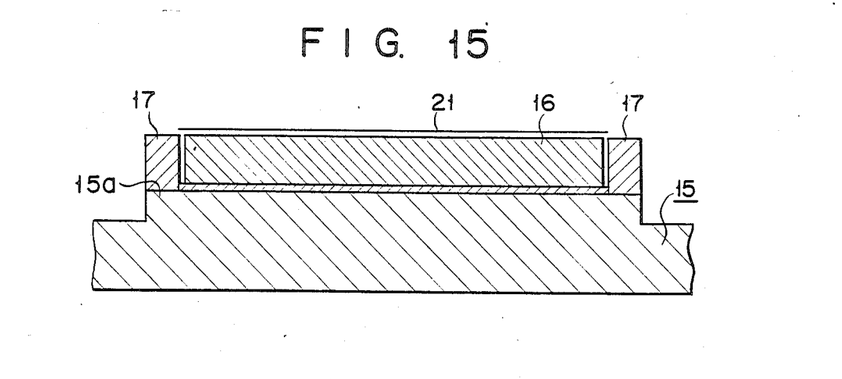
FIG. 15 shows a partial, cross-sectional view of the rotor shown in FIG. 14.
Figure 16:
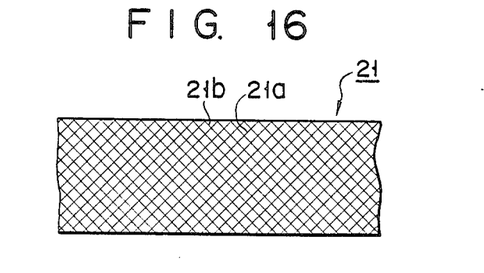
FIG. 16 shows a reinforcing member attached to the rotor shown in FIG. 14.

In this embodiment, the reinforcing tapes 21 are formed, as shown in FIG. 14 to FIG. 16, of thermally shrinkable synthetic weft fibers 21a made, for example, of polyester fiber, and inorganic warp fibers 21b made, for example, of glass fiber. The fibers 21a, 21b are so wound on the outer peripheral surfaces of the permanent magnets 16 as to have an angle of 30° to 60° with respect to the circumferential direction of the permanent magnets 16.

Strip-shaped reinforcing tapes 21 thus formed are lap wound on the outer peripheral surfaces of the permanent magnets 16, substantially without tension, and the winding ends of the thermally shrinkable synthetic warp fibers 21b are fusion-bonded by a heater such as a soldering iron. After the reinforcing tapes 21 are wound around the outer peripheral surfaces of the permanent magnets 16, a hot blast is blown, for example, onto the wound portion to shrink the synthetic weft fiber 21a, thereby tightening the reinforcing tapes 21 around the outer peripheral surfaces of the permanent magnets 16. Further, epoxy or acrylic synthetic resin is coated over the reinforcing tapes 21 and cured.

Therefore, in a rotor with permanent magnets 16, as described above, the permanent magnets 16 are bonded to the shaft 15, and the pressing force of the permanent magnets 16 against the shaft 15 is increased by the shrinking forces generated by heating the weft fibers 21a of the reinforcing tapes 21, wound on the outer peripheral surfaces of the permanent magnets 16, thereby sufficiently enhancing the reinforcement in the bonding of the permanent magnets 16 to the shaft 15. Thus, the reliability in the bonding strength of the permanent magnets 16 to the shaft 15 is improved, and even if the rotor 14 is rotated at a high speed, an accident in which the permanent magnets 16 separate or scatter from the shaft 15 can be prevented in advance. Since the reinforcing tapes 21 are tightly wound around the outer peripheral surfaces of the permanent magnets 16 by the heat-induced shrinkage of the weft fibers 21a, this facilitates excellent productivity, as compared to a conventional insulating film which must be wound carefully, while applying tension, in order not to break the film.

Further, since the reinforcing tapes 21 are woven from thermally shrinkable synthetic weft fibers 21a and nonshrinkable inorganic warp fibers 21b, at 30° to 60° with respect to the circumferential direction of the permanent magnets 16, these members are very difficult to break as compared to the insulating film, thereby largely enhancing the reliability of the reinforcement. When the weft fibers 21a are thermally shrunk, the reinforcing tapes 21 are shrunk in both the circumferential and axial directions of the permanent magnets 16, and thus a pressing force against the permanent magnets 16 can be achieved. Further, since the inorganic warp fibers 21b, which have high mechanical strength, are disposed at 30° to 60° with respect to the circumferential direction of the permanent magnets 16, the reinforcing strength of the reinforcing tapes 21 can be improved, with respect to the circumferential direction of the permanent magnets 16, to provide sufficiently durable strength against the centrifugal force generated when the rotor 14 rotates.

In the embodiment described above, the case where strip-shaped reinforcing members are wound on the outer peripheral surfaces of the permanent magnets 16 has been described. However, the invention is not limited to this particular embodiment, and the same advantages can be obtained, as in the previous embodiments, by constructing, in advance, a reinforcing member formed, by weaving, in a tubular shape, with substantially the same diameter as that of the permanent magnets, and coating it over the outer peripheral surfaces of all the permanent magnets.

Figure 17:
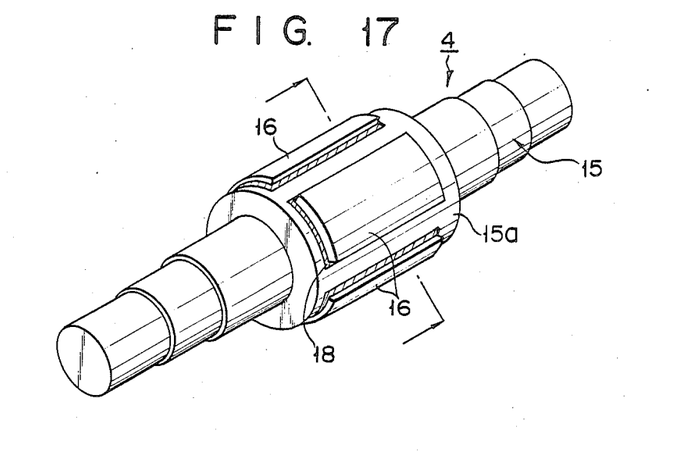
FIG. 17 shows a perspective view of a rotor manufactured by a method according to a fifth embodiment of the invention.
Figure 18:
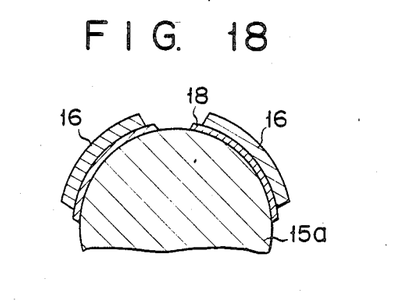
FIG. 18 shows a partial, cross-sectional view of the rotor shown in FIG. 17, at a step of the manufacturing method according to the invention.

A method for manufacturing a rotor according to a fifth embodiment of the present invention will be described with reference to FIG. 17 to FIG. 19.

Reference character 15 designates a shaft of a rotor. A large-diameter portion 15a is formed substantially at the center of shaft 15, and a plurality of permanent magnets 16 of arcuate cross section are bonded by a bonding agent 18 to the outer peripheral surface of the large-diameter portion 15a. The bonding agent 18 is made, for example, of modified acrylate, being anaerobic and ultraviolet ray-curable. The shaft 15 is bonded by the following method. The bonding agent 18 is coated over the large-diameter portion 15a of the shaft 15, the permanent magnets 16 are retained by a jig (not shown) on the coated surface of the shaft 15, and ultraviolet rays are irradiated in this state. Thus, the bonding agent 18, between the butting surfaces of the permanent magnets 16 and the shaft 15, is sealed from atmospheric air, and anaerobically cured in approx. several to several tens of seconds. The bonding agent 18 extending from the butting surfaces is also irradiated by the ultraviolet rays and also cured in approx. several to several tens of seconds. Therefore, the permanent magnets 16 are bonded to the shaft 15 (by the curing of the agent coated over the large-diameter portion 15a of the shaft 15, retaining the permanent magnets 16) in a very short time-at the most, several tens of seconds. Thus, automation can be facilitated to remarkably improve productivity. Further, as the curing time is short, the permanent magnets 16 may be retained by the jig for that much shorter time, a large facility such as a heating furnace can be eliminated, and an ultraviolet lamp for irradiating ultraviolet rays can be provided to reduce the facility cost.

Since the bonding agent can be anaerobic and ultraviolet ray-curable, curing does not start when merely coating the agent over the shaft 15, but starts after retention of the permanent magnets 16 and the irradiation of ultraviolet rays. Thus, curing start time can be freely arranged to provide excellent workability and high adaptability for automating manufacturing steps.

Figure 19:
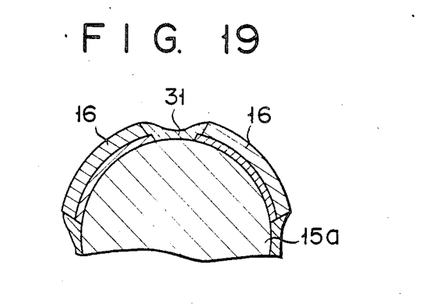
FIG. 19 shows a partial, cross-sectional view of the rotor shown in FIG. 17, at a processing step of a modified manufacturing method according to the invention.

As shown in FIG. 19, an ultraviolet-curable bonding agent 31 is lap coated over the bonding agent 18 exposed from butting surfaces of the permanent magnets 16 and the shaft 15, and both agents may be cured by irradiating ultraviolet rays. According to the method described above, the bonding strength can be further enhanced.

According to the present invention, as is apparent from the abovementioned description, the bonding strength of the permanent magnets to the shaft can be improved while enhancing thermal resistance, and a rotor with permanent magnets having high reliability and high productivity can be provided.

Further, according to the present invention, the same excellent advantages as mentioned above can be obtained where the bonding agent is anaerobically cured on the butting surfaces of the shaft.

What is claimed is:

1. A rotor with permanent magnets, said rotor comprising:
    (a) a shaft;
    (b) a pair of positioning rings axially spaced on the outer peripheral surface of said shaft; and
    (c) permanent magnets bonded onto the outer peripheral surface of said shaft between said pair of positioning rings, said permanent magnets being disposed such that gaps are left between said permanent magnets and said positioning rings, said gaps serving to absorb thermal expansion of said permanent magnets and/or said positioning rings.

2. The rotor according to claim 1, wherein:
    (a) said permanent magnets are disposed along the axial direction of said shaft between said positioning rings and
    (b) said gaps are provided between said permanent magnets for absorbing thermal expansion of said permanent magnets.

3. The rotor according to claim 1, wherein:
    (a) said permanent magnets are disposed along the axial direction of said shaft between said positioning rings and
    (b) a bonding agent is used to fill said gaps between said permanent magnets.

4. A rotor with permanent magnets, said rotor comprising:
    (a) a shaft;
    (b) permanent magnets bonded to the outer peripheral surface of said shaft; and
    (c) a reinforcing member wound around the outer peripheral surface of said permanent magnets, said reinforcing member being made of woven fibers for reinforcing the bonding of said permanent magnets, said reinforcing member comprising:
        (i) thermally shrinkable synthetic resin fibers extending along the circumferential direction of said permanent magnets and
        (ii) nonshrinkable inorganic fibers extending along the axial direction of said permanent magnets.

5. A rotor with permanent magnets, said rotor comprising:
    (a) a shaft;
    (b) permanent magnets bonded to the outer peripheral surface of said shaft; and
    (c) a reinforcing member wound around the outer peripheral surface of said permanent magnets, said reinforcing member being made of woven fibers for reinforcing the bonding of said permanent magnets, said reinforcing member comprising:
        (i) nonmagnetic metallic fine wires extending along the circumferential direction of said permanent magnets and
        (ii) inorganic fibers extending along the axial direction of said permanent magnets.

6. The rotor according to claim 5, wherein said reinforcing member comprises:
    (a) nonmagnetic metallic fine wires and inorganic fibers alternately disposed along the axial direction of said permanent magnets and extending along the circumferential direction of said permanent magnets and
    (b) inorganic fibers extending along the axial direction of said permanent magnets.

7. The rotor according to claim 4, wherein said reinforcing members is formed in a strip shape.

8. The rotor according to claim 4, wherein said reinforcing member is formed in a tubular shape having an outer diameter at least substantially equal to that of said permanent magnets.

9. The rotor according to claim 5, wherein said reinforcing member is formed in a strip shape.

10. The rotor according to claim 5, wherein said reinforcing member is formed in a tubular shape having an outer diameter at least substantially equal to that of said permanent magnets.

* * * * *